(12) United States Patent
Ishikawa et al.

(10) Patent No.: US 11,073,243 B2
(45) Date of Patent: Jul. 27, 2021

(54) LOW-TEMPERATURE TANK AND METHOD FOR MANUFACTURING SAME

(71) Applicant: IHI Corporation, Koto-ku (JP)

(72) Inventors: Yasuhiro Ishikawa, Tokyo (JP);
Hatsuo Mori, Tokyo (JP)

(73) Assignee: IHI Corporation, Koto-ku (JP)

( * ) Notice: Subject to any disclaimer, the term of this patent is extended or adjusted under 35 U.S.C. 154(b) by 155 days.

(21) Appl. No.: 16/451,220

(22) Filed: Jun. 25, 2019

(65) Prior Publication Data

US 2019/0309905 A1 Oct. 10, 2019

Related U.S. Application Data

(63) Continuation of application No. PCT/JP2017/038483, filed on Oct. 25, 2017.

(30) Foreign Application Priority Data

Mar. 22, 2017 (JP) .............................. JP2017-055549

(51) Int. Cl.
*F17C 13/00* (2006.01)

(52) U.S. Cl.
CPC .... *F17C 13/006* (2013.01); *F17C 2201/0109* (2013.01); *F17C 2203/0604* (2013.01);
(Continued)

(58) Field of Classification Search
CPC .... F17C 1/16; F17C 2260/011; F17C 13/006; F17C 2201/0109; F17C 2203/0604; F17C 2203/0646; F17C 2203/0648; F17C 2203/0663; F17C 2209/2163; F17C 2209/2181; F17C 2223/0161; Y10S 220/901; Y10S 220/23; B65D 90/041
See application file for complete search history.

(56) References Cited

U.S. PATENT DOCUMENTS 3,150,794 A * 9/1964 Schlumberger ....... A47J 41/028
220/560.03
3,239,092 A * 3/1966 Levenetz .................. F17C 1/16
220/590
(Continued)

FOREIGN PATENT DOCUMENTS

| GB | 1 226 035 | 3/1971 |
| JP | 51-062417 | 5/1976 |

(Continued)

OTHER PUBLICATIONS

Extended European Search Report dated Jun. 29, 2020 in European Patent Application No. 17901669.6, 9 pages.
(Continued)

*Primary Examiner* — Shawn M Braden
(74) *Attorney, Agent, or Firm* — Oblon, McClelland, Maier & Neustadt, L.L.P.

(57) ABSTRACT

A low-temperature tank includes a container main body. The container main body includes a metal liner forming a storage space and a wall member formed of carbon fiber reinforced plastic wound on an outer peripheral surface of the metal liner. The metal liner includes a bent portion that extends in two directions intersecting each other on a surface thereof and that is bent to project toward the storage space.

12 Claims, 3 Drawing Sheets

(52) U.S. Cl.
CPC ............... *F17C 2203/0646* (2013.01); *F17C 2203/0648* (2013.01); *F17C 2203/0663* (2013.01); *F17C 2209/2163* (2013.01); *F17C 2209/2181* (2013.01); *F17C 2223/0161* (2013.01)

(56) References Cited

U.S. PATENT DOCUMENTS

| | | | |
|---|---|---|---|
| 3,570,700 A * | 3/1971 | Yamamoto | F17C 3/022 220/560.06 |
| 3,570,701 A * | 3/1971 | Yamamoto | B21D 1/00 220/560.06 |
| 4,366,977 A * | 1/1983 | Davis | B60P 7/14 296/24.41 |
| 5,150,812 A | 9/1992 | Adams | |
| 7,540,395 B2 | 6/2009 | Dhellemmes | |
| 9,829,154 B2 | 11/2017 | Clark et al. | |
| 2005/0082297 A1 | 4/2005 | Dhellemmes | |
| 2009/0127271 A1* | 5/2009 | Muraoka | B21K 21/12 220/586 |
| 2013/0186893 A1 | 7/2013 | Claudel | |
| 2015/0114970 A1 | 4/2015 | Joh et al. | |
| 2015/0192251 A1 | 7/2015 | Tupper et al. | |
| 2016/0031152 A1 | 2/2016 | Lebrun et al. | |
| 2017/0292651 A1* | 10/2017 | Newhouse | F17C 13/002 |
| 2017/0343158 A1 | 11/2017 | Kato et al. | |

FOREIGN PATENT DOCUMENTS

| | | |
|---|---|---|
| JP | 53-42889 | 4/1978 |
| JP | 01-105099 | 4/1989 |
| JP | 09-088176 | 3/1997 |
| JP | 9-126393 A | 5/1997 |
| JP | 11-227881 A | 8/1999 |
| JP | 2002-276894 | 9/2002 |
| JP | 2006-17213 A | 1/2006 |
| JP | 2011-512287 A | 4/2011 |
| JP | 2012-111558 A | 6/2012 |
| JP | 2016-521335 | 7/2016 |
| JP | 5948330 | 7/2016 |
| RU | 2 282 101 C2 | 3/2006 |
| WO | WO 2010/040922 A1 | 4/2010 |
| WO | WO 2013/083662 A2 | 6/2013 |
| WO | WO 2016/084475 A1 | 6/2016 |

OTHER PUBLICATIONS

Russian Decision to Grant dated Jan. 29, 2020 in Russian Patent Application No. 2019132639 (with unedited computer generated English translation), 12 pages.

International Search Report dated Dec. 26, 2017 in PCT/JP2017/038483 filed Oct. 25, 2017.

Written Opinion dated Dec. 26, 2017 in PCT/JP2017/038483 filed Oct. 25, 2017.

Decision to Grant dated Aug. 18, 2020 in Japanese Patent Application No. 2019-506932, 3 pages.

* cited by examiner

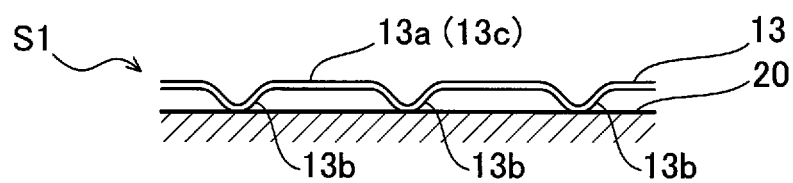
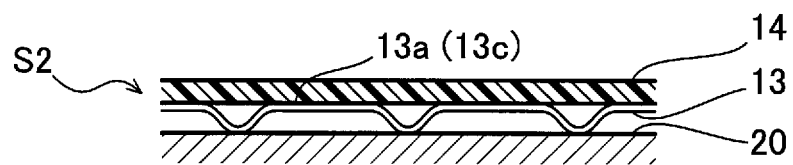
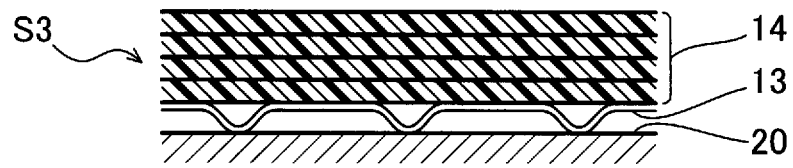
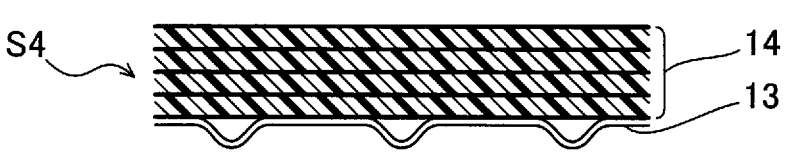
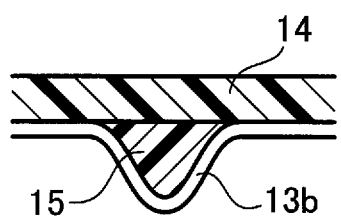
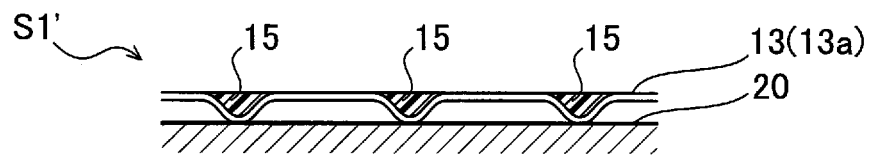

LOW-TEMPERATURE TANK AND METHOD FOR MANUFACTURING SAME

CROSS REFERENCE TO RELATED APPLICATIONS

This application is a continuation application of International Application No. PCT/JP2017/038483, now WO2018/173348, filed on Oct. 25, 2017, which claims priority to Japanese Patent Application No. 2017-055549, filed on Mar. 22, 2017, the entire contents of which are incorporated by reference herein.

BACKGROUND

1. Technical Field

The present disclosure relates to a low-temperature tank for storing a cryogenic liquid and a method for manufacturing the same.

2. Description of the Related Art

Weight saving of constituent members is always demanded in a space vehicle such as a rocket. A tank for storing propellant is no exception, and weight saving by using a composite material using carbon fiber reinforced plastic (CFRP) has been proposed. In connection with this, Japanese Patent No. 5948330 discloses a tank for storing a cryogenic liquid. This tank includes a tank main body formed of a metal liner, and a composite material wound around the tank main body.

SUMMARY

A linear expansion coefficient of a metal liner and a linear expansion coefficient of a composite material such as carbon fiber reinforced plastic are largely different from each other. Therefore, in a case of using these elements together as constituent members of a low-temperature tank for storing a cryogenic liquid, the metal liner may peel from the composite material because of thermal contraction or thermal expansion in association with filling and consumption of the liquid.

The present disclosure has been made in view of the above circumstances, and it is an object to provide a low-temperature tank and a method for manufacturing the same that can prevent a metal liner, which is a constituent member of a container, from peeling from a composite material.

A first aspect of the present disclosure is a low-temperature tank comprising a container main body that includes a metal liner forming a storage space of the low-temperature tank and a wall member formed of fiber reinforced plastic wound on an outer peripheral surface of the metal liner, wherein the metal liner includes a bent portion that extends in two directions intersecting each other on a surface thereof and that is bent to project toward the storage space.

The low-temperature tank may further comprise a filler filled between the bent portion and the wall member.

A second aspect of the present disclosure is a method for manufacturing a low-temperature tank, the method comprising: winding a metal liner around a mandrel, the metal liner including a bent portion that extends in two directions intersecting each other on a surface thereof and is bent to project toward the mandrel; winding a wall member formed of fiber reinforced plastic on an outer peripheral surface of the metal liner wound around the mandrel; sintering the wall member; and detaching the mandrel from the metal liner.

The manufacturing method may further comprise filling a filler into the bent portion.

The filler may be formed of an elastic body that maintains a shape when being filled at a sintering temperature of the wall member.

The filler may be formed of a material that maintains a shape when being filled at a normal temperature and that contracts at a sintering temperature of the wall member or lower.

The metal liner may have an uneven structure in a portion adhering to the wall member.

According to the present disclosure, it is possible to provide a low-temperature tank and a method for manufacturing the same that can prevent a metal liner, which is a constituent member of a container, from peeling from a wall member.

BRIEF DESCRIPTION OF THE DRAWINGS

FIGS. 3A, 3B, 3C and 3D, are diagrams illustrating processes for manufacturing the low-temperature tank according to the embodiment of the present disclosure.

FIG. 4A is a diagram illustrating a modification of the low-temperature tank according to the embodiment of the present disclosure.

FIG. 4B is a diagram illustrating a manufacturing process in this modification.

FIG. 5A is a diagram illustrating a first modification and FIG. 5B is a diagram illustrating a second modification.

DESCRIPTION OF THE EMBODIMENTS

Figure 1:
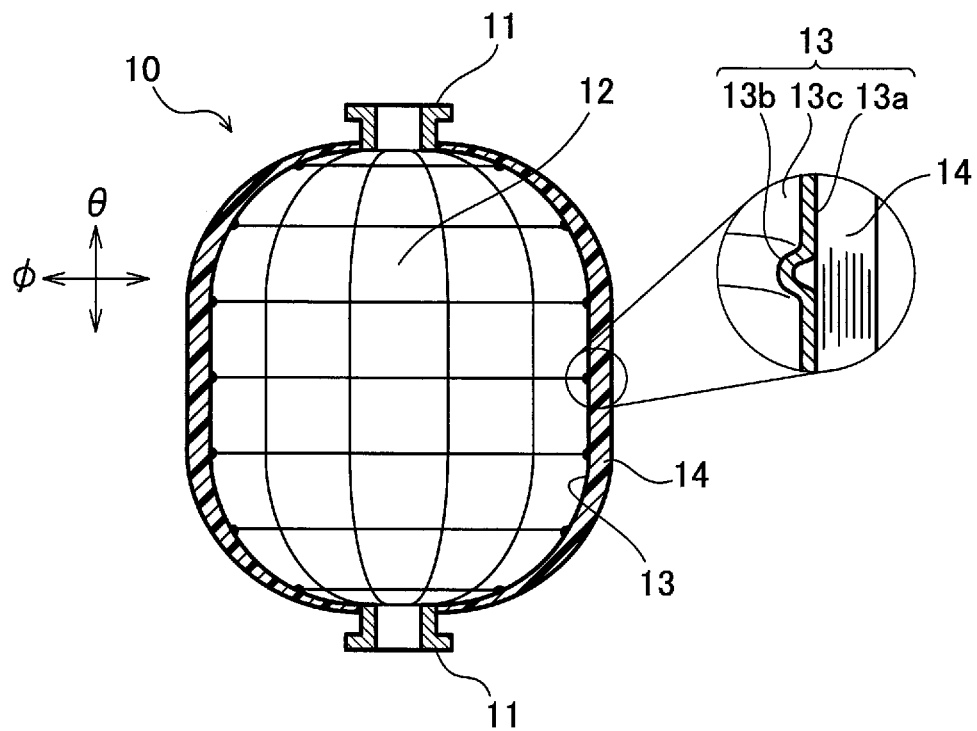
FIG. 1 is a cross-sectional diagram and a partially enlarged diagram of a low-temperature tank according to an embodiment of the present disclosure.

A low-temperature tank and a method for manufacturing the same according to an embodiment of the present disclosure will be described below with reference to the accompanying drawings. In the drawings, common parts are denoted by like reference signs and redundant explanations thereof will be omitted.

FIG. 1 is a cross-sectional diagram and a partially enlarged diagram of a low-temperature tank according to the present embodiment. The low-temperature tank according to the present embodiment is loaded on a space vehicle, such as a rocket. However, application of the low-temperature tank according to the present embodiment is not limited to a space vehicle, and can be applied to a vehicle, a vessel, storage facilities, and the like. Therefore, a cryogenic liquid stored (accommodated) in the low-temperature tank according to the present embodiment is not limited to propellant, such as liquid hydrogen, liquid oxygen, liquefied natural gas, and the like but may be liquid nitrogen or liquid helium that is general-purpose refrigerant.

As illustrated in FIG. 1, the low-temperature tank includes a hollow container main body 10. The container main body 10 has ports 11 and 11 for allowing injection and discharge of a liquid at a top and a bottom thereof, for example. The ports 11 and 11 are joined to a metal liner 13 described later by welding or the like.

The container main body 10 includes the metal liner 13 that forms a storage space 12 for a liquid in the low-temperature tank, and a wall member 14 wound on an outer peripheral surface 13a of the metal liner 13. The metal liner 13 prevents leakage of the liquid from the storage space 12. The wall member 14 maintains the shape of the metal liner 13 and also ensures the mechanical strength of the entire low-temperature tank.

The metal liner 13 is a thin metal plate. It is desirable that the metal liner 13 is light and has an appropriate level of malleability. Therefore, examples of the material of the metal liner 13 are aluminum, magnesium, and alloy containing at least one of these metals. The thickness of the metal liner 13 is set in accordance with the weight and workability that are required, and is set to about 0.5 mm, for example.

Meanwhile, the wall member 14 is configured by a composite material that includes resin as a matrix and fiber impregnated with resin (that is, fiber reinforced plastic). Because the matrix before being sintered is adhesive, it adheres to the outer peripheral surface 13a of the metal liner 13. Thereafter, the composite material is sintered, so that the container main body 10 has a double-wall structure of the wall member 14 and the metal liner 13.

It is desirable that the fiber of the composite material is light, has sufficient strength even at a cryogenic temperature, and is chemically stable. Fiber that satisfies this condition is carbon fiber, aramid fiber, and silicon carbide fiber, for example. It is desirable that the composite material is carbon fiber reinforced plastic (CFRP) that has highest strength. However, the composite material may be other fiber reinforced plastic (FRP), as long as the above condition is satisfied.

Figure 2A:
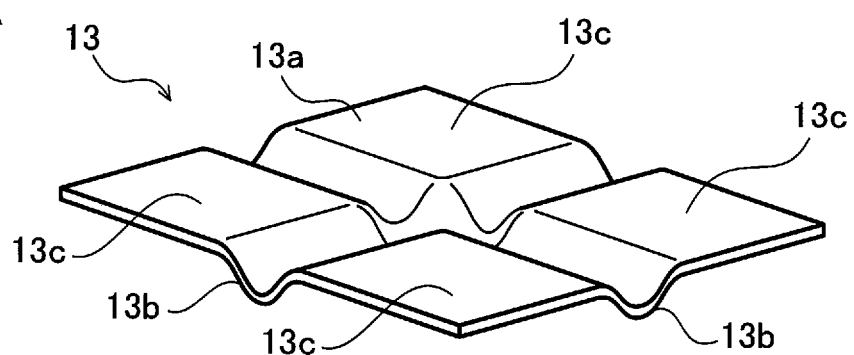
FIG. 2A is a partially enlarged diagram of a metal liner according to the embodiment of the present disclosure.
Figure 2B:
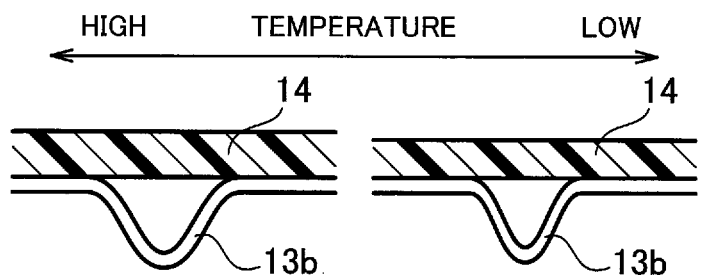
FIG. 2B is a cross-sectional diagram illustrating extension and contraction (shrinkage) of the metal liner and a wall member.

As illustrated in FIGS. 1 and 2, the metal liner 13 includes a bent portion 13b and an adhering portion 13c. The bent portion 13b extends in two directions that intersect each other on a surface of the metal liner 13 and is bent to project toward the storage space 12. In other words, the bent portion 13b is bent to project toward inside of the container main body 10. The bent portion 13b is formed by press working of the metal liner 13, for example. Meanwhile, the adhering portion 13c is a portion (a surface) of the metal liner 13, other than the bent portion 13b, and is a flat surface or a curved surface that is smooth, for example. The adhering portion 13c couples the bent portions 13b that are adjacent to each other, and adheres to the wall member 14 by winding the wall member 14.

As described above, a linear expansion coefficient of metal and a linear expansion coefficient of a composite material are largely different from each other. Specifically, a linear expansion coefficient of metal is about an order of magnitude larger than a linear expansion coefficient of a composite material. Therefore, in a case where a low-temperature tank repeats thermal contraction (shrinkage) and thermal expansion in association with filling and consumption of a cryogenic liquid, this repetition of thermal contraction and thermal expansion may cause the metal liner 13 to peel from the wall member 14. In the present embodiment, the adhering portion 13c may peel from the wall member 14.

On the other hand, the internal stress of the metal liner 13, which prompts peeling of the metal liner 13, is relaxed by deformation of the bent portion 13b itself. As illustrated in FIG. 1, the bent portion 13b does not adhere to the wall member 14. Therefore, when the container main body 10 thermally expands or contracts (shrinks), the bent portion 13b can be deformed (extend and contract, or be bent) without being affected by adhesion with the wall member 14. As a result, stress generated at a joining portion (a joining region) between the metal liner 13 and the wall member 14 is relaxed, so that it is possible to prevent the metal liner 13 from peeling from the wall member 14 (see FIG. 2B).

The bent portion 13b extends in two directions. The two extending directions are the θ direction (the pole direction) and the φ direction (the azimuth direction) when the axis of rotational symmetry (the center axis) of the low-temperature tank is made coincident with a reference axis of a polar coordinate system (see FIG. 1). In this case, the two extending directions intersect each other at right angles. However, an angle formed by the intersecting two directions is not necessarily 90°, as long as appropriate extension or contraction of the metal liner 13, which enables the above peeling to be avoided, is obtained.

Next, a method for manufacturing a low-temperature tank according to the present embodiment is described. FIGS. 3A to 3D are diagrams illustrating manufacturing processes of the low-temperature tank according to the present embodiment. As illustrated in these drawings, the low-temperature tank according to the present embodiment is manufactured by using a mandrel (a cylindrical member) 20, for example.

First, the metal liner 13 is wound around the mandrel 20, as illustrated in FIG. 3A (Step S1). The bent portion 13b has to be bent to project toward the storage space 12. Therefore, the metal liner 13 is wound on an outer peripheral surface of the mandrel 20 in such a manner that the bent portion 13b projects toward the mandrel 20. Edges of the metal liner 13 that are in contact with each other when the metal liner 13 is wound are joined to each other by welding or the like.

Next, as illustrated in FIG. 3B, the wall member 14 is wound on the outer peripheral surface 13a of the metal liner 13 wound around the mandrel 20 (Step S2). At this time, the wall member 14 has not been heated yet, and the matrix of a composite material constituting the wall member 14 has not been solidified. Therefore, the wall member 14 has adhesiveness, and the composite material in a first layer adheres to the adhering portion 13c of the metal liner 13. The composite material of the wall member 14 is wound on the outer peripheral surface 13a of the metal liner 13 a plurality of times until a predetermined level of strength is obtained within an allowable weight range (see FIG. 3C). A winding direction of the composite material may be changed every predetermined number of winding times (number of layers). By this winding, longitudinal (extending) directions of fiber as viewed in a thickness direction of the wall member 14 intersect each other, and therefore the strength of the wall member 14 is improved.

Next, the wall member 14 wound around the metal liner 13 is sintered by a predetermined burner or in a heating furnace (Step S3). The temperature during this sintering is the temperature at which the matrix is solidified, and is 300° C., for example. By this sintering, the matrix of the composite material constituting the wall member 14 is solidified, so that the entire shape is maintained.

After being sintered, the wall member 14 is cooled until it reaches a normal temperature, for example. In association with contraction during cooling, a number of minute gaps (i.e. cracks or voids) are formed in the wall member 14. These gaps provides gas-permeability (breathability) to the wall member 14. Thereafter, the mandrel 20 is detached from the metal liner 13, as illustrated in FIG. 3D (Step S4).

Further, the port 11 and the like are joined, so as to form a low-temperature tank. Further joining may be performed for the metal liner and the wall member that have been subjected to the above processes, in accordance with the shape or the size of the low-temperature tank.

FIG. 4A is a diagram illustrating a modification of the low-temperature tank according to the embodiment of the present disclosure, and FIG. 4B is a diagram illustrating a manufacturing process in the modification. As illustrated in these drawings, the low-temperature tank may further include a filler 15 filled between the bent portion 13b and the wall member 14. As described above, when the wall member 14 is wound on the outer peripheral surface 13a of the metal liner 13, the matrix of a composite material constituting the wall member 14 has not been solidified. Therefore, there is a possibility that the matrix enters into the bent portion 13b of the metal liner 13. The matrix that has entered into the bent portion 13b adheres to the bent portion 13b and therefore, deformation of the bent portion 13b is hindered when the matrix is solidified.

The filler 15 prevents the matrix from entering into the bent portion 13b. As illustrated in FIG. 4B, the filler 15 is filled in (applied on) the bent portion 13b after winding of the metal liner 13 around the mandrel 20 in Step S1 and before winding of the wall member 14 in Step S2 (Step S1').

The filler 15 is formed of an elastic body that maintains its shape when being filled at the sintering temperature of the wall member 14. Further, the filler 15 has such a level of elasticity that the filler 15 does not interfere with deformation of the bent portion 13b. Such an elastic body is made of fluorocarbon polymers, for example.

The filler 15 may be formed of a material that maintains its shape when being filled at a normal temperature and contracts at a sintering temperature of the wall member 14 or lower. That is, the filler 15 prevents entry of the matrix into the bent portion 13b by maintaining the shape illustrated in FIG. 4A when being filled in Step S2', and contracts during sintering in Step S3. Such a material is foamed polystyrene, for example. The filler 15 may remain after contraction. However, even in this case, the filler 15 does not affect the function of the metal liner 13 as a container and maintenance of the mechanical strength of the wall member 14.

The sintered wall member 14 is not airtight. In other words, the sintered wall member 14 is gas-permeable (breathable). Therefore, even in a case of using a material that contracts at a sintering temperature or lower as the filler 15, an evaporation component and other expanding gas in the material are discharged through the wall member 14 to outside. Accordingly, contraction of the filler 15 does not affect maintenance of the shape of the solidified wall member 14.

Figure 5A:
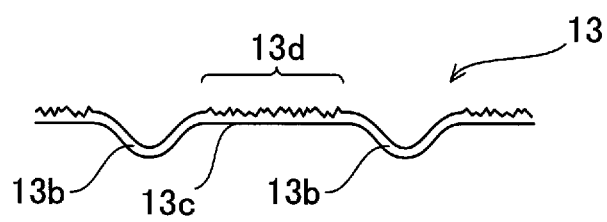
FIGS. 5A and 5B are diagrams illustrating modifications of the metal liner according to the embodiment of the present disclosure, where
Figure 5B:
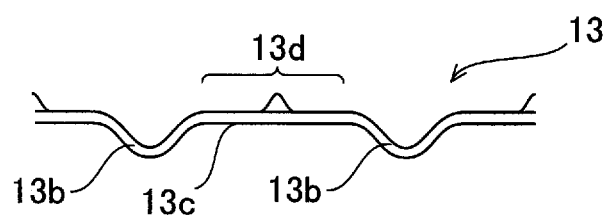

FIG. 5A is a diagram illustrating a first modification of the metal liner 13, and FIG. 5B is diagram illustrating a second modification of the metal liner 13. As illustrated in these drawings, the metal liner 13 may have an uneven structure 13d in the adhering portion 13c. The uneven structure 13d is formed of fine grooves or undulation, as illustrated in FIG. 5A, for example. Such structure is formed by surface roughening, such as scratching or blasting. Alternatively, the uneven structure 13d may be a projection that projects toward the wall member 14, as illustrated in FIG. 5B, for example. In either case, an area of contact of the adhering portion 13c with the wall member 14 (a composite material) is increased, so that the adhesion strength between the adhering portion 13c and the wall member 14 (a composite material) can be improved.

According to the present embodiment, the metal liner 13 ensures airtightness for storing a cryogenic liquid. When thermal contraction or thermal expansion of a low-temperature tank occurs, the bent portion 13b of the metal liner 13 relaxes stress generated in a joining portion (a joining region) between the metal liner 13 and the wall member 14, which would cause peeling (detachment) due to thermal contraction or thermal expansion. Therefore, it is possible to prevent the metal liner 13 from peeling (detaching) from the wall member 14. Meanwhile, the wall member 14 ensures the mechanical strength of the low-temperature tank. Because the wall member 14 is constituted by a composite material, the weight of the entire low-temperature tank is much lighter than a low-temperature tank that uses metal or concrete for a wall member. Therefore, a low-temperature tank can be obtained which can withstand a harsh environment in which thermal contraction and thermal expansion are repeated, for example, in a rocket, and which is light and has sufficient strength. Further, because the metal liner 13 ensures airtightness, it is not necessary that the wall member 14 is airtight. Therefore, according to the manufacturing method of the present embodiment, strictness of handling of each constituent member and strictness of temperature control during sintering of the wall member 14 are relaxed as compared to those in a manufacturing method that requires airtightness for a composite material. That is, manufacturing processes are simplified, and the manufacturing cost can be also suppressed.

The present disclosure is not limited to the embodiment described above and is defined in the descriptions of the scope of claims, and the present disclosure includes all sorts of modifications with equivalent meanings and within the scope of the descriptions in the scope of claims.

What is claimed is:

1. A low-temperature tank comprising
a container main body that includes a metal liner forming a storage space of the low-temperature tank and a wall member formed of fiber reinforced plastic wound on an outer peripheral surface of the metal liner, wherein
the metal liner includes a bent portion that extends in two directions intersecting each other on a surface thereof and that is bent to project toward the storage space.

2. The low-temperature tank according to claim 1, further comprising a filler filled between the bent portion and the wall member.

3. The low-temperature tank according to claim 2, wherein the filler is formed of an elastic body that maintains a shape when being filled at a sintering temperature of the wall member.

4. The low-temperature tank according to claim 2, wherein the filler is formed of a material that maintains a shape when being filled at a normal temperature and that contracts at a sintering temperature of the wall member or lower.

5. The low-temperature tank according to claim 1, wherein the metal liner has an uneven structure in a portion adhering to the wall member.

6. The low-temperature tank according to claim 2, wherein the metal liner has an uneven structure in a portion adhering to the wall member.

7. The low-temperature tank according to claim 3, wherein the metal liner has an uneven structure in a portion adhering to the wall member.

8. The low-temperature tank according to claim 4, wherein the metal liner has an uneven structure in a portion adhering to the wall member.

9. A method for manufacturing a low-temperature tank, the method comprising:
  winding a metal liner around a mandrel, the metal liner including a bent portion that extends in two directions intersecting each other on a surface thereof and is bent to project toward the mandrel;
  winding a wall member formed of fiber reinforced plastic on an outer peripheral surface of the metal liner wound around the mandrel;
  sintering the wall member; and
  detaching the mandrel from the metal liner.

10. The method for manufacturing a low-temperature tank according to claim 9, further comprising filling a filler into the bent portion.

11. The method for manufacturing a low-temperature tank according to claim 10, wherein the filler is formed of an elastic body that maintains a shape when being filled at a sintering temperature of the wall member.

12. The method for manufacturing a low-temperature tank according to claim 10, wherein the filler is formed of a material that maintains a shape when being filled at a normal temperature and that contracts at a sintering temperature of the wall member or lower.

* * * * *